United States Patent [19]
Bailey

[11] Patent Number: 5,107,398
[45] Date of Patent: Apr. 21, 1992

[54] COOLING SYSTEM FOR COMPUTERS

[75] Inventor: Douglas A. Bailey, Concord, Mass.

[73] Assignee: Digital Equipment Corporation, Mass.

[21] Appl. No.: 530,663

[22] Filed: May 30, 1990

[51] Int. Cl.$^5$ .............................. H05K 7/20
[52] U.S. Cl. ........................ 361/384; 165/80.3;
165/104.33; 415/182.1; 98/1
[58] Field of Search .......... 361/384; 165/80.3, 104.33;
415/182.1; 98/1

[56] References Cited

U.S. PATENT DOCUMENTS

| | | | |
|---|---|---|---|
| 2,341,871 | 2/1944 | Karrer | 415/182.1 |
| 4,520,425 | 5/1985 | Ito | 361/384 |
| 4,907,645 | 3/1990 | Dumas et al. | 165/41 |

Primary Examiner—Leo P. Picard
Assistant Examiner—Young S. Whang
Attorney, Agent, or Firm—Arnold, White & Durkee

[57] ABSTRACT

A cooling system for cooling electronic components mounted in a cabinet of a computer includes an air circulation device mounted in the cabinet. The air circulation device draws cool, outside air through an air inlet in the cabinet and circulates the cool air over the electronic components. After passing over the electronic components, the air is drawn into an inlet of the fan and exhausted into a diffuser. The diffuser interconnects an outlet in the fan to an air outlet in the cabinet. The diffuser is of increasing cross sectional area and converts dynamic pressure of the air leaving the fan to static pressure. A plurality of air direction vanes are mounted in the air outlet in the cabinet which impart a velocity vector to the hot exhausting air in a direction away from the air inlet in the cabinet.

28 Claims, 4 Drawing Sheets

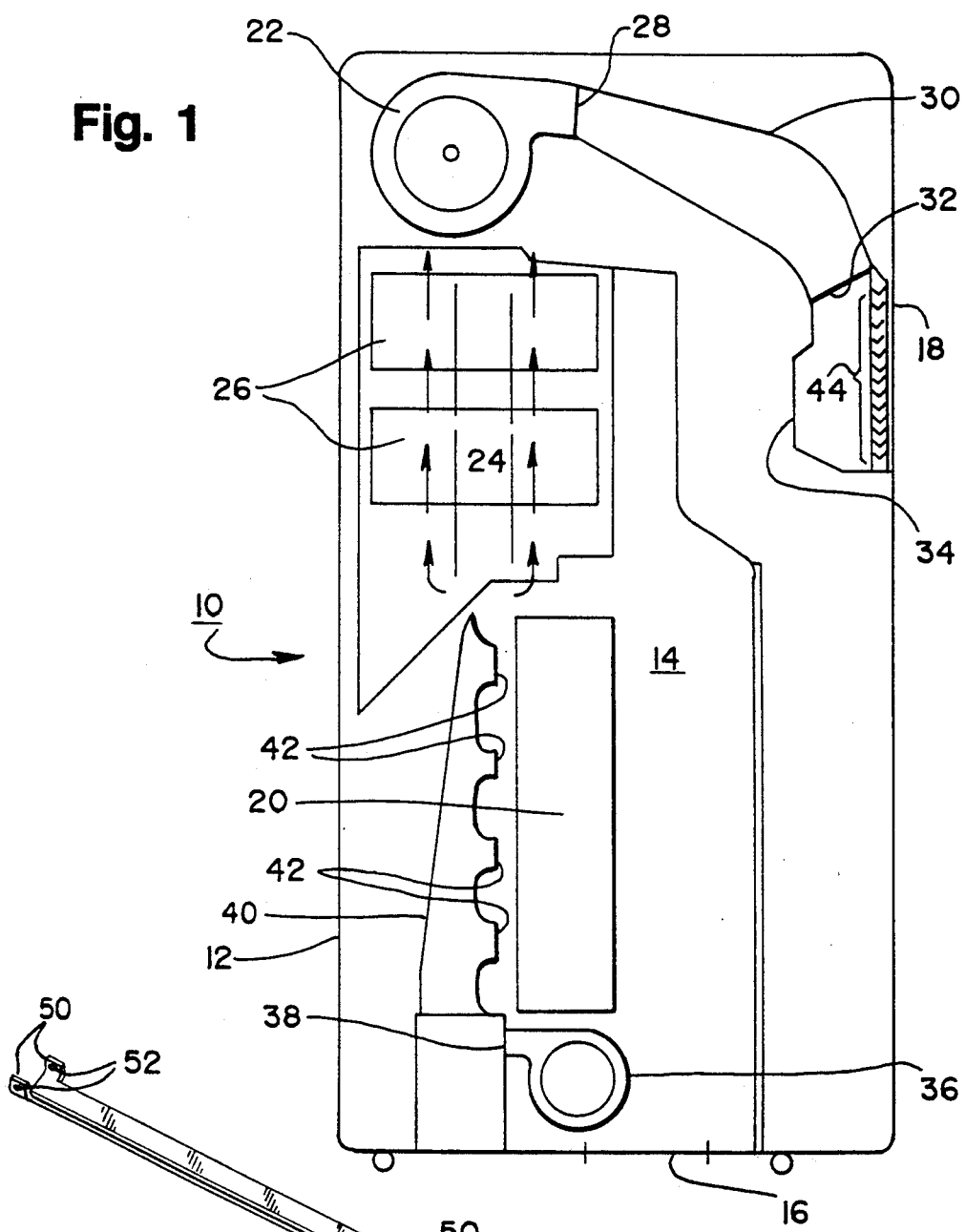
Fig. 1
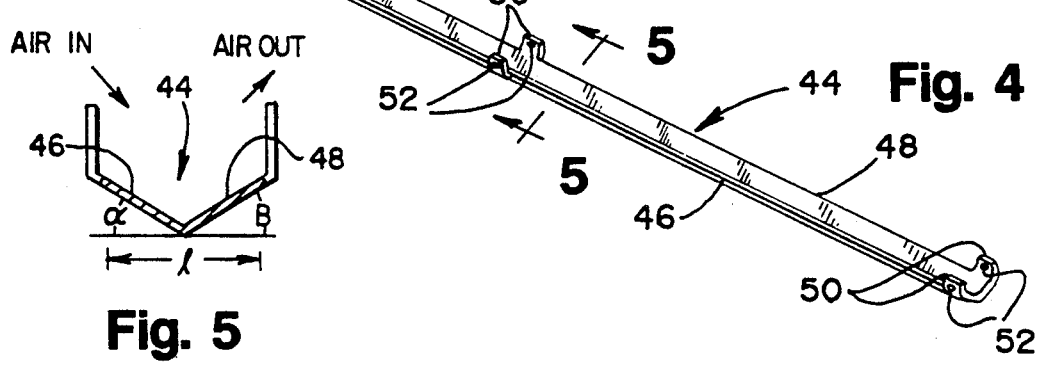
Fig. 4
Fig. 5

Fig. 2
PRIOR ART
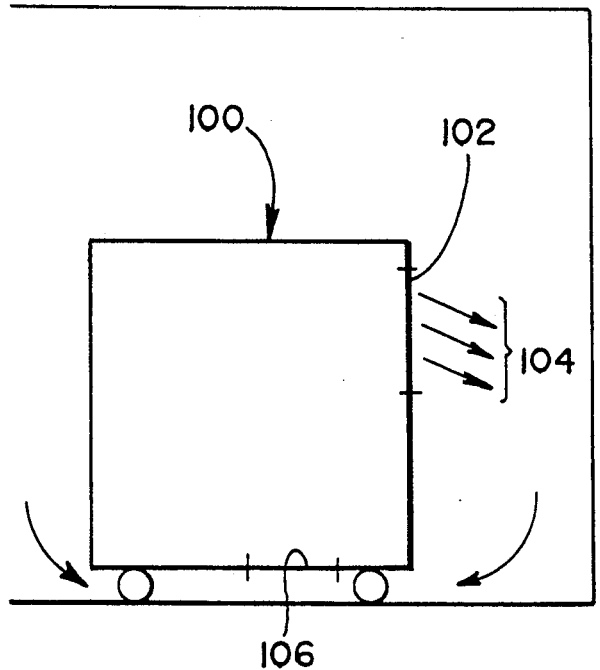
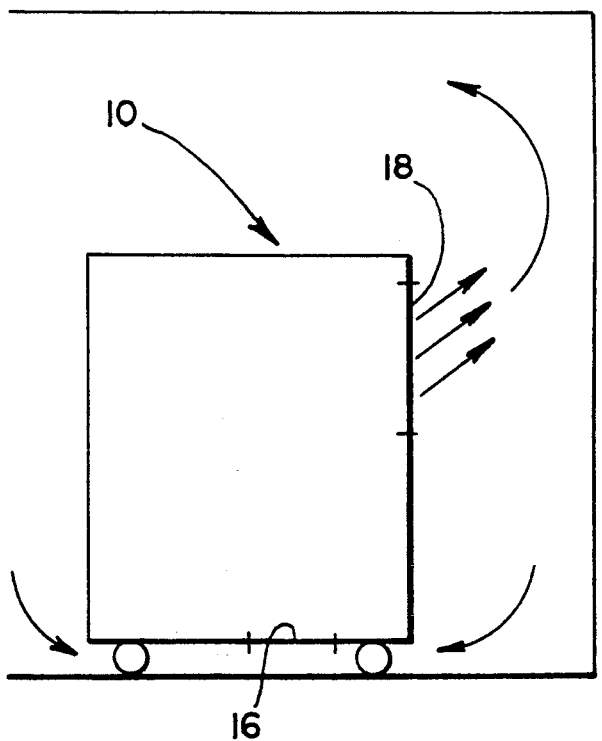
Fig. 3

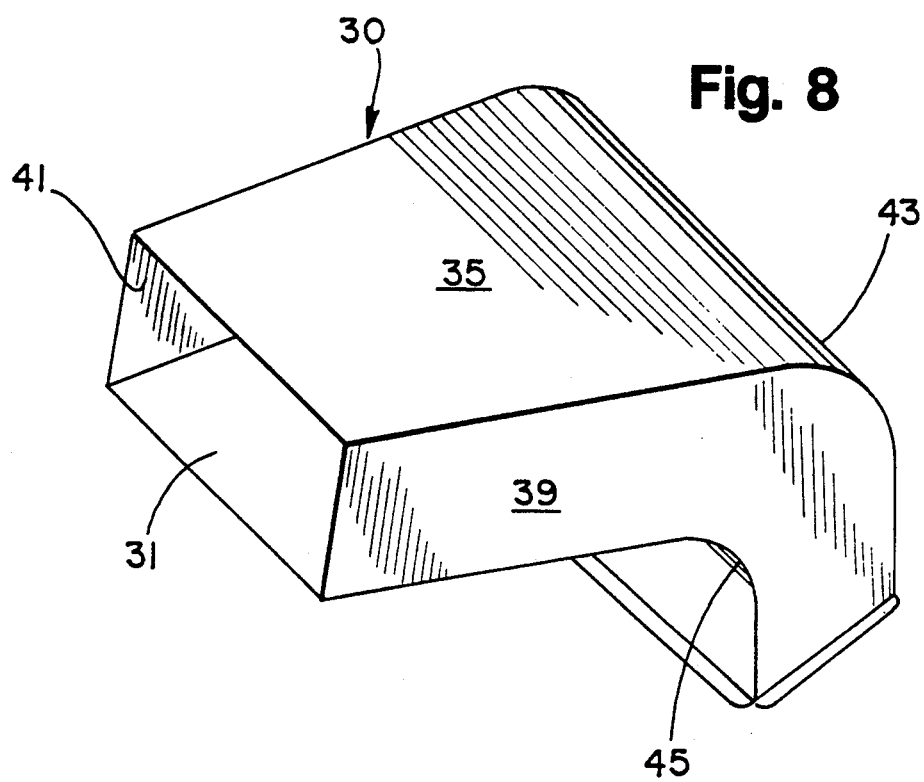
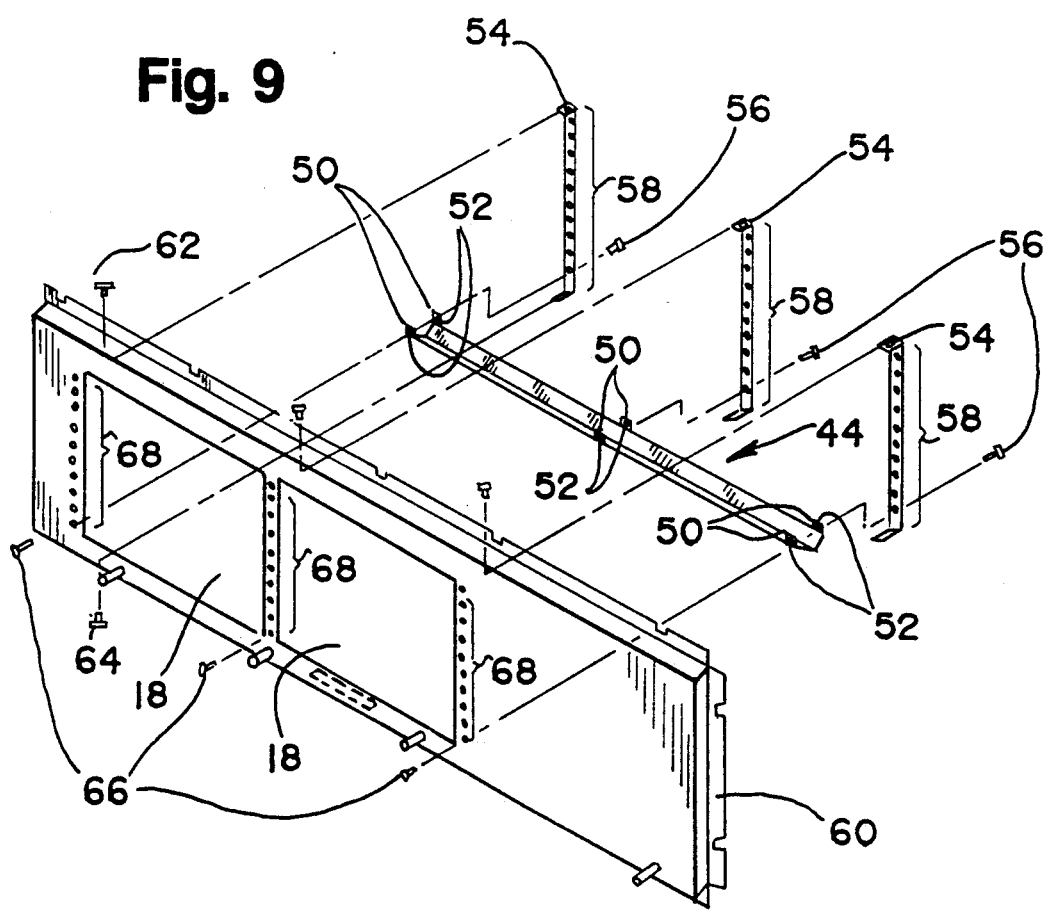

COOLING SYSTEM FOR COMPUTERS

BACKGROUND OF THE INVENTION

A. Field of the Invention

The present invention relates to a new and improved cooling system for electronic components in a computer and to a new and improved method for cooling electronic components; and more specifically, the present invention relates to a fan mounted in the cabinet of a computer for circulating air from an air inlet, over electronic components and out of the cabinet through an air outlet, and to a diffuser interconnecting the fan and the air outlet. The present invention also relates to a plurality of air direction vanes mounted in the air outlet of a computer cabinet to direct hot exhaust air away from an air inlet in the cabinet.

B. Description of the Background Art

Typically, computers include a large number of electronic components that are heated to elevated temperatures during operation. Cooling is required to avoid thermal damage to these electronic components. An example of ways to cool components is disclosed in U.S. Pat. No. 4,862,320 owned by the assignee of the present invention. The most efficient and least expensive procedure for cooling electronic components in a computer is accomplished by drawing ambient air from a surrounding room in which the computer is located into the computer cabinet through an air inlet. A fan or similar device is used to draw this air through the inlet and circulate the air over the electronic components.

A second fan draws the heated air after it has passed over the electronic components and blows it out an air outlet into the surrounding room. Air passing through the second fan has a high velocity which results in a high dynamic head. This dynamic head reduces the volume of air flowing through the cabinet and decreases the efficiency of the fan. Another problem experienced in cooling electronic components in a computer is having hot exhaust air enter the air inlet of the computer. The hot exhaust air raises the overall temperature in the computer which can result in thermal damage to the electronic components. It is desirable that the temperature in the computer be kept low or cool since a lower temperature lowers the failure rate of the electronic components.

SUMMARY OF THE INVENTION

Briefly, the present invention is directed to a new and improved cooling system for cooling electronic components mounted in a computer. The cooling system provides more efficient cooling of electronic components and reduces the temperature of the cooling air drawn into the computer.

More specifically, the present invention is directed to a cooling system that includes a first air circulation device, such as a fan, mounted in a computer cabinet. The computer cabinet includes an air inlet and an air outlet. The fan draws cool air through the air inlet and over the electronic components, thereby cooling the electronic components. The air then passes through the fan and into a diffuser. The diffuser interconnects the outlet of the fan with the air outlet in the cabinet, and functions to convert the dynamic head or dynamic pressure of the air leaving the fan to static pressure. In this way, the flow of air is increased thereby enhancing the cooling capacity of the cooling system.

The present invention also includes one or more air directional vanes mounted in the air outlet in the computer cabinet. The air directional vanes direct exhaust air passing out of the cabinet in a direction away from the air inlet in the cabinet. In this way, the hot air being exhausted from the cabinet is not drawn into the inlet thereby raising the overall temperature of the air used to cool the electronic components.

BRIEF DESCRIPTION OF THE DRAWINGS

Other objects and advantages of the invention will become apparent upon reading the following detailed description and upon reference to the drawings in which:

FIG. 1 is a generally vertical cross sectional schematic illustration of a computer including a cooling system constructed in accordance with the principles of the present invention;

FIG. 2 is a schematic illustration of a prior art computer and circulation of outside air around the prior art computer;

FIG. 3 is an illustration similar to FIG. 2, schematically illustrating the flow of air around a computer incorporating the cooling system of the present invention;

FIG. 4 is a perspective view of an air direction vane used in the cooling system of the present invention;

FIG. 5 is a view taken generally along line 5—5 in FIG. 4;

FIG. 8 is a perspective view of a diffuser; and

FIG. 9 is an exploded, perspective view illustrating the assembly of air direction vanes onto a computer housing.

Figure 6:
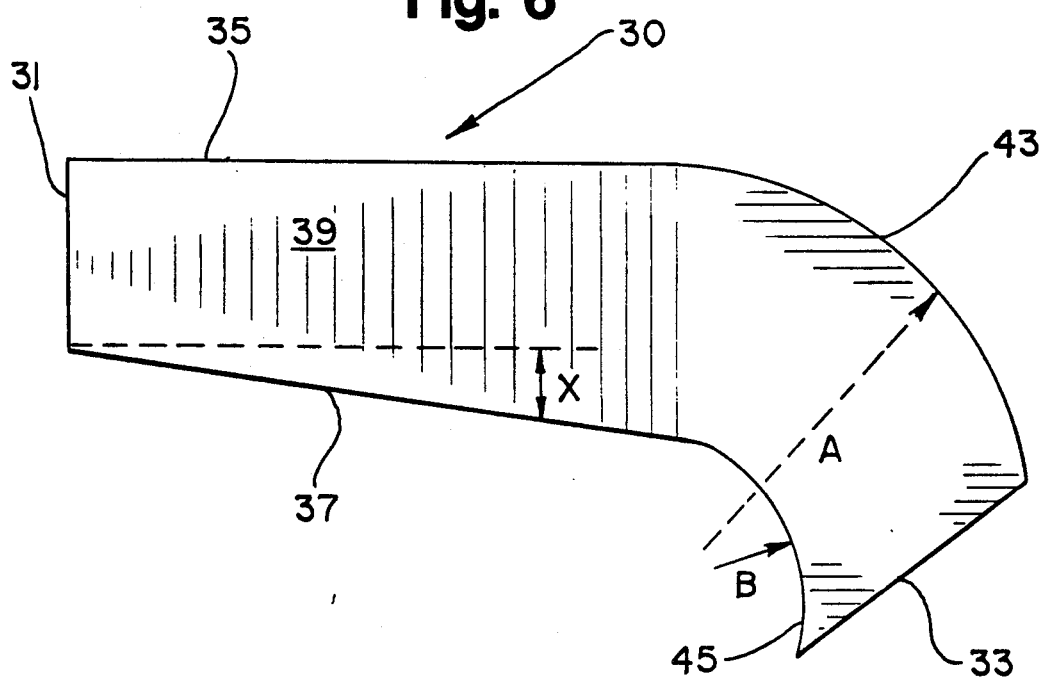
FIG. 6 is side elevational view of a diffuser used in the cooling system illustrated in FIG. 1.

While the invention is susceptible to various modifications and alternative forms, a specific embodiment thereof has been shown by way of example in the drawings and will herein be described in detail. It should be understood, however, that it is not intended to limit the invention to the particular forms disclosed, but to the contrary, the intention is to cover all modifications, equivalents, and alternatives falling within the spirit and scope of the invention as defined by the appended claims.

DESCRIPTION OF THE PREFERRED EMBODIMENT

Referring initially to FIG. 1, there is illustrated a computer generally designated by the reference numeral 10. As described herein, the computer 10 is cooled by a cooling system constructed in accordance with the principles of the present invention. The computer 10 is defined by a cabinet or housing 12 that encloses an internal cavity 14. Cooling air enters the cavity 14 through an air inlet 16 formed in the cabinet 12. After performing its cooling function, the air which is elevated in temperature is exhausted through an air outlet 18 formed in the cabinet 12.

In one embodiment of the present invention, electronic components 20 are mounted in the housing 12 and are cooled by ambient air drawn into the cavity 14 through the air inlet 16 by a first fan 22 mounted above the electronic components 20. The first fan 22 circulates air over the electronic components 20. After the cooling air circulates over the electronic components 20, the air is drawn in the direction of the arrows 24 to cool a plurality of module power supplies 26 also mounted in the cabinet 12. After passing over the module power supplies 26, the air, now elevated in temperature, is drawn into the fan 22 and exhausted through a fan outlet 28 into a pressure converter or diffuser 30. The diffuser 30 interconnects the outlet 28 of the first fan 22 with the inlet 32 of a plenum chamber 34. The plenum chamber 34 is connected to the air outlet 18, and hot air is exhausted through the air outlet 18.

In the prior art, the outlet 28 of the fan 22 was connected directly to the inlet 32 of the plenum chamber 34. This prior art arrangement resulted in reduced fan cooling efficiencies. These reduced efficiencies were due to the existence of a large dynamic head or dynamic pressure in the air exiting the fan 22 at the fan outlet 28. This air in the prior art system was of high velocity, low pressure and low volume.

The diffuser 30 of the present invention increases the efficiency of the fan 22 and increases the flow of air through the internal cavity 14 of the computer 10 resulting in improved cooling capacity and efficiency of the cooling system of the present invention. The diffuser 30 is of a gradually increasing cross sectional area, such that the cross sectional area of the diffuser 30 adjacent the inlet 32 of the plenum chamber 34 is greater than the cross sectional area of the portion of the diffuser 30 adjacent the outlet 28 of the fan 22. This increasing cross sectional area reduces the velocity of the air flowing through the diffuser 30 and increases the pressure.

Figure 7:
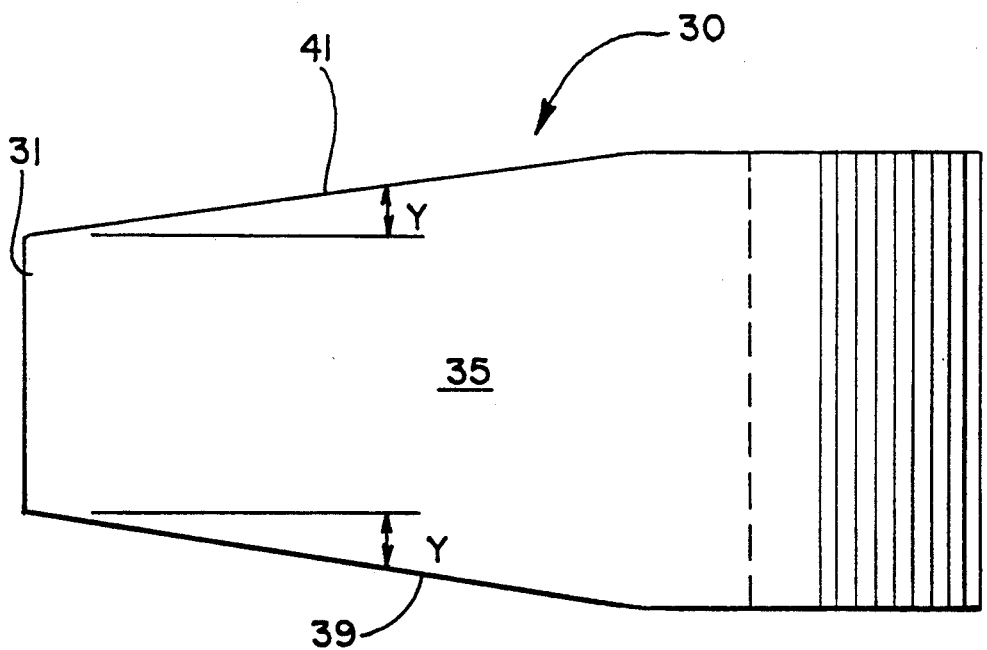
FIG. 7 is a top plan view of the diffuser illustrated in FIG. 6.

The configuration and changing cross sectional area of the diffuser can best be see in FIGS. 6 and 7. The diffuser 30 includes an inlet 31, an outlet 33, a top surface 35, a bottom surface 37, a first side 39, and a second side 41. The top surface 35 is straight or horizontal and extends to a first turning section 43 that curves along a radius A to the outlet 33. In a preferred embodiment, this radius is six inches.

The bottom surface 37 diverges from the upper surface 35 at an angle X. In a preferred embodiment, the angle X is 9°. The bottom surface 37 extends to a second turning section 45 that curves along a radius B to the outlet 33. In a preferred embodiment, the radius B is two inches. The first turning section 43 and the second turning section 45 provide the delivery of uniform low velocity air to a large pattern exit grille in outlet 18 thereby minimizing the pressure drop through the exit grille.

As previously described, the cross sectional area of the diffuser 30 increases. In addition to the divergence of the bottom surface 37 from the top surface 35 by the angle X, the first side 39 and the second side 41 diverge at the angles Y. In a preferred embodiment, the angles Y are each 5°.

The intended purpose of the diffuser 30 is to decrease resistance to air flow by delivering uniform low velocity air to the air outlet 18. If the angles X and Y are too large, air flow through the diffuser 30 becomes a jet rather than flow that follows the contour of the inner surface of the diffuser 30 and the air does not slow down to provide the desired static pressure increase. This same principle also applies to the radii A and B. If A or B is too large, the air flow will separate from the surface of the diffuser 30 resulting in a jet. It is preferred that the ratio of A to B be in the range of 2.5 to 3.5. The values of 9° for X, 5° for Y, six inches for A and two inches for B have been found to avoid creation of a jet in the diffuser 30 while achieving the desired static pressure conversion.

The flow of air through the diffuser 30 is governed by the equation $$P_t = P_s + \frac{rV^2}{2},$$

where $P_t$ is total pressure, $P_s$ is static pressure, r is the density of the air, and V is velocity of the air. The total pressure is relatively constant along a streamline. As the cross sectional area of the diffuser 30 increases, however, the velocity decreases because of the continuity of mass, in accordance with the equation m=rVA, where m is mass flow, r is density of the air, V is the velocity of the air and A is cross sectional area of the diffuser 30. This decreasing velocity results in a pressure rise. Since the static pressure at the outlet 32 of the diffuser 30 is determined by the pressure losses through the air outlet 18 and the air pressure in the room in which the computer 14 is housed, the pressure rise along the diffuser 30 will cause a decrease in static pressure at the outlet 28 of the fan 22. This decreased static pressure decreases the load on the fan 22 and increases the flow of air through the fan 22.

The diffuser 30 also causes a decreased loss in the static pressure as the flow goes through the air outlet 18 of the cabinet 12. This is because the pressure loss through the air outlet is in accordance with the equation:

$$\text{Delta } P = K\left(\frac{rV^2}{2}\right)$$

where delta P is pressure loss and K is a pressure loss coefficient. It is known that uniform, low velocity air flow experiences a lower pressure loss than non-uniform, high velocity air flow.

The result of air flow through the diffuser 30 is that the dynamic pressure of the air flowing from the fan 22 is converted to static pressure. The static pressure results in a slight vacuum at the fan 22 and a decrease in the pressure loss at the air outlet 18. The pressure loss at the air outlet 18 is decreased due to the delivery by the diffuser 30 of a uniform, low velocity air flow to the air outlet 18. Consequently, the fan 22 works less to draw air through it and to force air toward the air outlet 18. The fan 22 operates more efficiently, and its performance is increased while energy consumption is constant.

The placement of the fan 22 in the cabinet 12 away from the air outlet 18 eliminates line of sight acoustic emission. Acoustic emission is further reduced by attaching sound absorbing material over the outer surface of the diffuser 30.

In an alternative embodiment of the present invention, a second fan 36 may be mounted adjacent the air inlet 16 (FIG. 1). An outlet 38 of the second fan 36 extends into a plenum chamber 40. The plenum chamber 40 has a plurality of nozzles 42 that are directed toward the electronic components 20. In operation, the second fan 36 draws ambient air surrounding the bottom of the cabinet 12 through the air inlet 16 and directs that air under pressure into the plenum chamber 40. The air is then directed by the nozzles 42 over the electronic components 20. The flow of the air after passing over the electronic components 20 corresponds generally to the direction indicated by the arrows 24. The first fan 22 draws the air from the electronic components 20 over the module power supplies 26, and hot air exits the first fan 22 at a high velocity and low pressure through the fan outlet 28. This high velocity, low pressure air is converted to low velocity, high pressure air by the diffuser 30. The hot air then enters the plenum chamber 34 and is directed through the air outlet 18.

Since the air exiting the air outlet 18 is hot air, it is preferable that this hot air is not drawn into the cabinet 12 through the air inlet 16. In prior art computers 100 (as illustrated in FIG. 2), hot air is directed out of the computer 100 with a downward component of velocity (as indicated by arrows 104) toward a cool air inlet 106. Consequently, hot exhaust air is drawn into the air inlet 106, elevating the internal temperature of the computer which will set off a temperature sensing device and disable the computer 100.

The cooling system of the present invention avoids this problem of recirculating hot exhaust air by directing the exhaust air through the air outlet 18 with an upward directed component of velocity. As illustrated in FIG. 3, an upward component of velocity in the exhaust air causes the hot exhaust air to circulate through the room, thereby lowering the temperature of the air before it is drawn into the air inlet 16 and used for cooling purposes. The results are air of a lower temperature circulating through the computer 10 providing fewer failures, better reliability, decreased maintenance, and better availability.

The upwardly directed component of velocity is imparted to the exhaust air by a plurality of directional air vanes 44 mounted in the air outlet 18 (FIG. 1). The directional air vanes 44 are generally of a v-shaped configuration with a first leg 46 on the plenum 34 side and a second leg 48 that is on the air outlet side (FIG. 4). The length of the air directional vanes 44 or the distance air travels over the air vanes 44 is indicated by the reference letter l. The directional air vanes 44 impart an approximately 60° change in direction of the air flow.

More specifically, the first leg 46 of the directional air vanes 44 is at an angle α with the horizontal (FIG. 5). Preferably, this angle is 30°. Similarly, the second leg 48 is at an angle β to the horizontal and this angle is also preferably 30°. The air exiting the diffuser 30 through the air outlet 18 follows the leg 46 and is given an upward component of velocity imparted by the leg 48. The result is the exhaust air exits the air outlet 18 with an upwardly directed velocity component (FIG. 3) away from the air inlet 16. This circulation of the hot exhaust air minimizes any increase in the temperature of the inlet air to the computer.

Referring now to FIG. 9, there is illustrated an assembly of the air direction vanes 44. Each air direction vane 44 includes mounting tabs 50 with preformed holes 52. The tabs 50 on a first side of each air direction vane 44 are secured to mounting brackets 54 by fasteners 56 that extend through holes 58 in each mounting bracket 54 and holes 52 in the tabs 50 on the first side of the air direction vanes 44. Each mounting bracket 54 is secured to a panel or grille housing 60 by fasteners 62 and 64. In addition, the tabs 50 on a second side of each air direction vane 44 is secured to the panel or grille housing 60 by fasteners 66 that extend through holes 68 formed in the panel or grille housing 60 adjacent the outlet openings 18 and through holes 52. The distance between the adjacent holes 58 and 68 defines the pitch of the air direction vanes 44.

To ensure that the air direction vanes 44 turn the air through 60° and to have the proper number of air direction vanes 44 in the outlet 18 to ensure the proper viscous flow over the air direction vanes 44 thereby avoiding an undesired pressure loss, the number and spacing of the air direction vanes 44 preferably corresponds to a length to pitch ratio in the range of 1.6 to 2.2. In one preferred embodiment, the air direction vanes 44 are of a length of 0.78 inch and a pitch of 0.45 inch providing a length to pitch ratio of 1.73.

The cooling system of the present invention described in the preceding paragraphs includes a diffuser 30 and air direction vanes 44. Although the cooling system has been described as including one fan 22 connected to one diffuser 30, other cooling systems could include more than one fan 22 and one diffuser 30 each with a corresponding outlet 18.

I claim:

1. A cooling system for electronic components in a computer, comprising:
   a cabinet, said cabinet including an air inlet and an air outlet;
   a plurality of electronic components mounted in said cabinet;
   a first air circulation device mounted in said cabinet for drawing air through said air inlet, over said plurality of electronic components, and exhausting said air through said air outlet; and
   a pressure conversion device mounted in said cabinet interconnecting said first air circulation device and said air outlet to convert dynamic pressure in said air to static pressure.

2. The cooling system for electronic components in a computer set forth in claim 1, further comprising a second air circulation device mounted in said cabinet for drawing air through said air inlet and directing said air over said plurality of electronic components toward said first air circulation device.

3. The cooling system for electronic components in a computer set forth in claim 1 wherein said pressure conversion device is a diffuser.

4. The cooling system for electronic components in a computer set forth in claim 1 wherein said first air circulation device is a fan.

5. The cooling system for electronic components in a computer set forth in claim 1 further comprising at least one air directional member mounted in said air outlet to direct air passing through said air outlet away from said air inlet.

6. The cooling system for electronic components in a computer set forth in claim 5 wherein said air directional member comprises a air direction vane of a generally V shaped configuration.

7. The cooling system for electronic components in a computer set forth in claim 1 wherein said pressure conversion device is a diffuser having an increasing cross sectional area with a larger cross sectional area at said air outlet than at said first air circulation device.

8. The cooling system for electronic components in a computer set forth in claim 1 wherein said pressure conversion device is a diffuser having increasing cross sectional area defined by a top surface and a bottom surface, said bottom surface diverging from said top surface at an angle of 9°, and a first side and a second side, each said first side and said second side diverging from a centerline of said diffuser at an angle of 5°; said diffuser further including a first turning section extending from said top surface on a six inch radius and a second turning section extending from said bottom surface on a two inch radius.

9. The cooling system for electronic components in a computer set forth in claim 1 further comprising a plurality of air direction vanes mounted in said air outlet, said air direction vanes mounted in said air outlet with a length to pitch ratio in the range of 1.6 to 2.2.

10. The cooling system for electronic components in a computer set forth in claim 1 further comprising a plurality of air direction vanes each of a length of 0.78 inch and spaced from each other by a distance of 0.45 inch to provide a length to pitch ratio of 1.73.

11. The cooling system for electronic components in a computer set forth in claim 1 wherein said pressure conversion device is a diffuser including a first turning section on a first radius and a second turning section on a second radius, the ratio of said first radius to said second radius being in the range of 2.5 to 3.5.

12. A device for improving the performance of an electronic component cooling system by increasing the flow of cooling media, the electronic component cooling system being mounted in a computer and including a fan mounted in said computer for circulating air over a plurality of electronic components by drawing air in an air inlet and exhausting said air through an air outlet, the device comprising a converter mounted in said computer between said fan and said air outlet for converting a dynamic head of high velocity low pressure air generated by said fan to low velocity high pressure air at said air outlet.

13. The device for improving the performance of an electronic component cooling system claimed in claim 12 wherein said converter comprises a diffuser interconnecting said fan and said air outlet.

14. The device for improving the performance of an electronic component cooling system claimed in claim 12 wherein said converter comprises a diffuser interconnecting said fan and said air outlet, said diffuser increasing in cross sectional area from said fan to said air outlet.

15. The device for improving the performance of an electronic component cooling system claimed in claim 12 further comprising at least one air direction vane mounted in said air outlet for directing exhaust air from said air outlet in a direction away from said air inlet.

16. The device for improving the performance of an electronic component cooling system claimed in claim 15 wherein said air direction vane is generally V shaped.

17. A cooling system for cooling electronic components in a computer, comprising:
a housing;
an air inlet in said housing;
an air outlet in said housing;
a first fan mounted in said housing for drawing air from said air inlet, over electronic components mounted in said housing, and exhausting said air out said air outlet;
a pressure converting member interconnecting air from said fan to said air outlet for converting dynamic pressure of said air leaving said fan to static pressure; and
at least one air direction vane mounted in said air outlet to direct said air exhausting from said air outlet away from said air inlet.

18. The cooling system for cooling electronic components in a computer set forth in claim 17 wherein said air direction vane is generally V shaped.

19. The cooling system for cooling electronic components in a computer set forth in claim 17 wherein said pressure converting member is a diffuser.

20. The cooling system for cooling electronic components in a computer set forth in claim 17 wherein said pressure converting member is a diffuser having an increasing cross sectional area from said fan to said air outlet.

21. A method for cooling electronic components in a computer, comprising the steps of:
drawing air into a computer cabinet through an air inlet in said computer cabinet;
circulating said air using an air circulation device over electronic components mounted in said computer cabinet;
exhausting said air from said air circulation device through an air outlet in said computer cabinet; and
converting dynamic pressure in said air exhausting from said air circulation device to static pressure.

22. The method for cooling electronic components in a computer set forth in claim 21 further comprising the step of imparting a velocity component to said air exhausting through said air outlet in a direction away from said air inlet.

23. The method for cooling electronic components set forth in claim 21 wherein said step of converting dynamic pressure in said air exhausting from said air circulation device to static pressure includes moving said air through a diffuser of increasing cross sectional area.

24. The method for cooling electronic components set forth in claim 21 wherein said step of converting dynamic pressure in said air exhausting from said air circulation device to static pressure includes moving said air through a diffuser of increasing cross sectional area wherein said diffuser includes a top surface and a bottom surface diverging from said top surface at an angle of 9°, a first side and a second side each diverging from a centerline at an angle 5°, and a first turning section on a first radius and a second turning section on a second radius wherein the ratio of said first radius to said second radius is in the range of 2.5 to 3.5.

25. The method for cooling electronic components in a computer set forth in claim 21 further comprising the step of moving said air exhausting through said outlet over air direction vanes of a length to pitch ratio in the range 1.6 to 2.2.

26. A cooling system for electronic components in a computer, comprising:
a cabinet, said cabinet including an air inlet and an air
a plurality of electronic components mounted in said cabinet;
a first air circulation device mounted in said cabinet for drawing air through said air inlet, over said plurality of electronic components, and exhausting said air through said air outlet;
a pressure conversion device mounted in said cabinet interconnecting said first air circulation device and said air outlet to convert dynamic pressure in said air to static pressure; and
at least one air directional member mounted in said air outlet to direct air passing through said air outlet away from said air inlet, said air directional member comprises a air direction vane of a generally V shaped configuration.

27. A cooling system for electronic components in a computer, comprising;
- a cabinet, said cabinet including an air inlet and an air outlet;
- a plurality of electronic components mounted in said cabinet;
- a first air circulation device mounted in said cabinet for drawing air through said air inlet, over said plurality of electronic components, and exhausting said air through said air outlet;
- a pressure conversion device mounted in said cabinet interconnecting said first air circulation device and said air outlet to convert dynamic pressure in said air to static pressure; and
- a plurality of air direction vanes mounting in said air outlet, said air direction vanes mounted in said air outlet with a length to pitch ratio in the range of 1.6 to 2.2.

28. A method for cooling electronic components in a computer, comprising the steps of:
- drawing air into a computer cabinet through an air inlet in said computer cabinet;
- circulating said air using an air circulation device over electronic components mounted in said computer cabinet;
- exhausting said air from said air circulation device through an air outlet in said computer cabinet;
- converting dynamic pressure in said air exhausting from said air circulation device to static pressure; and
- moving said air exhausting through said outlet over air direction vanes of a length to pitch ratio in the range 1.6 to 2.2.

* * * * *